April 14, 1964 J. FABER 3,128,626
ILLUMINATOR FOR LIQUID LEVEL GAUGE
Filed Dec. 11, 1961 2 Sheets-Sheet 1
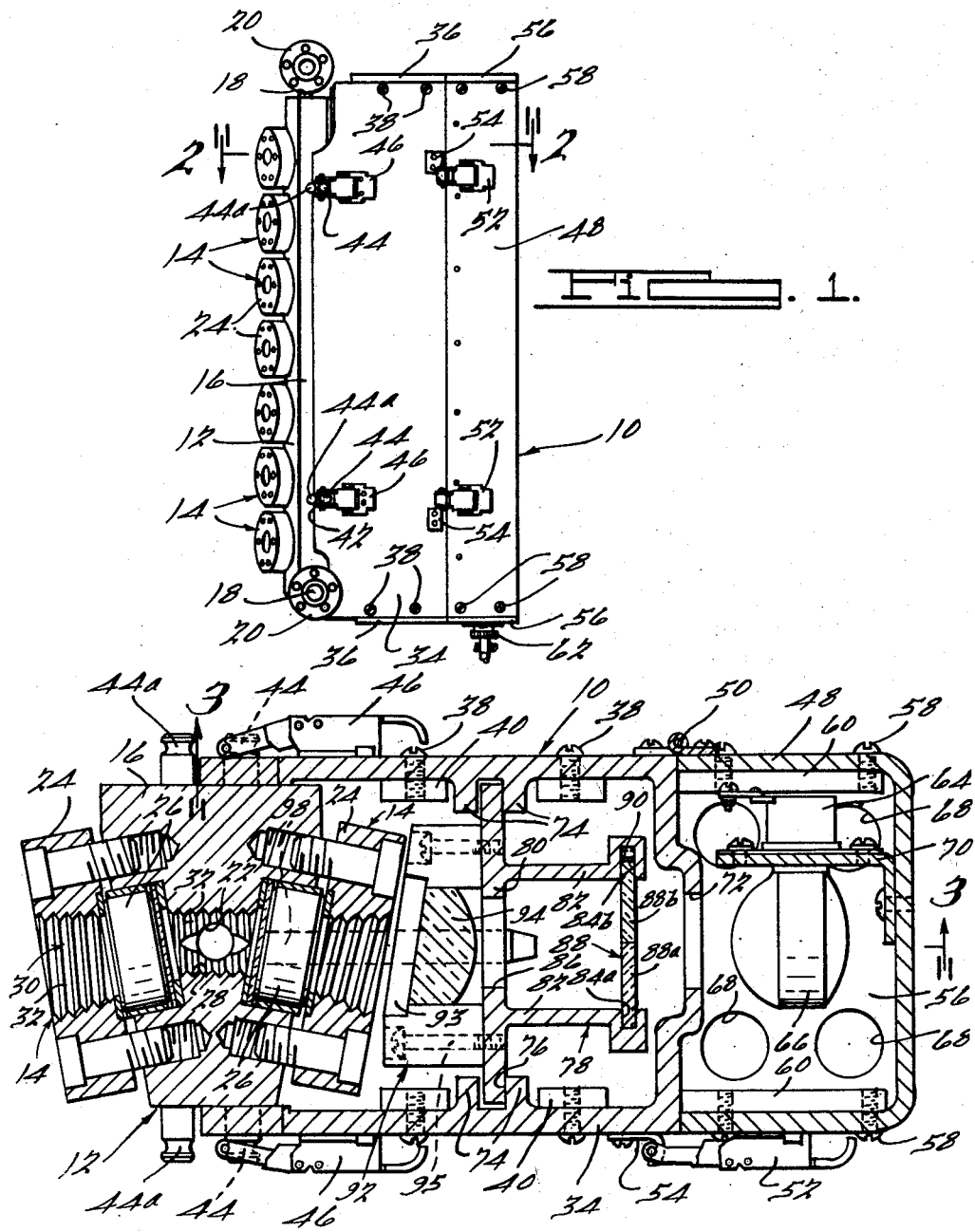
INVENTOR.
Josef Faber
BY
Harness, Dickey & Pierce
ATTORNEYS

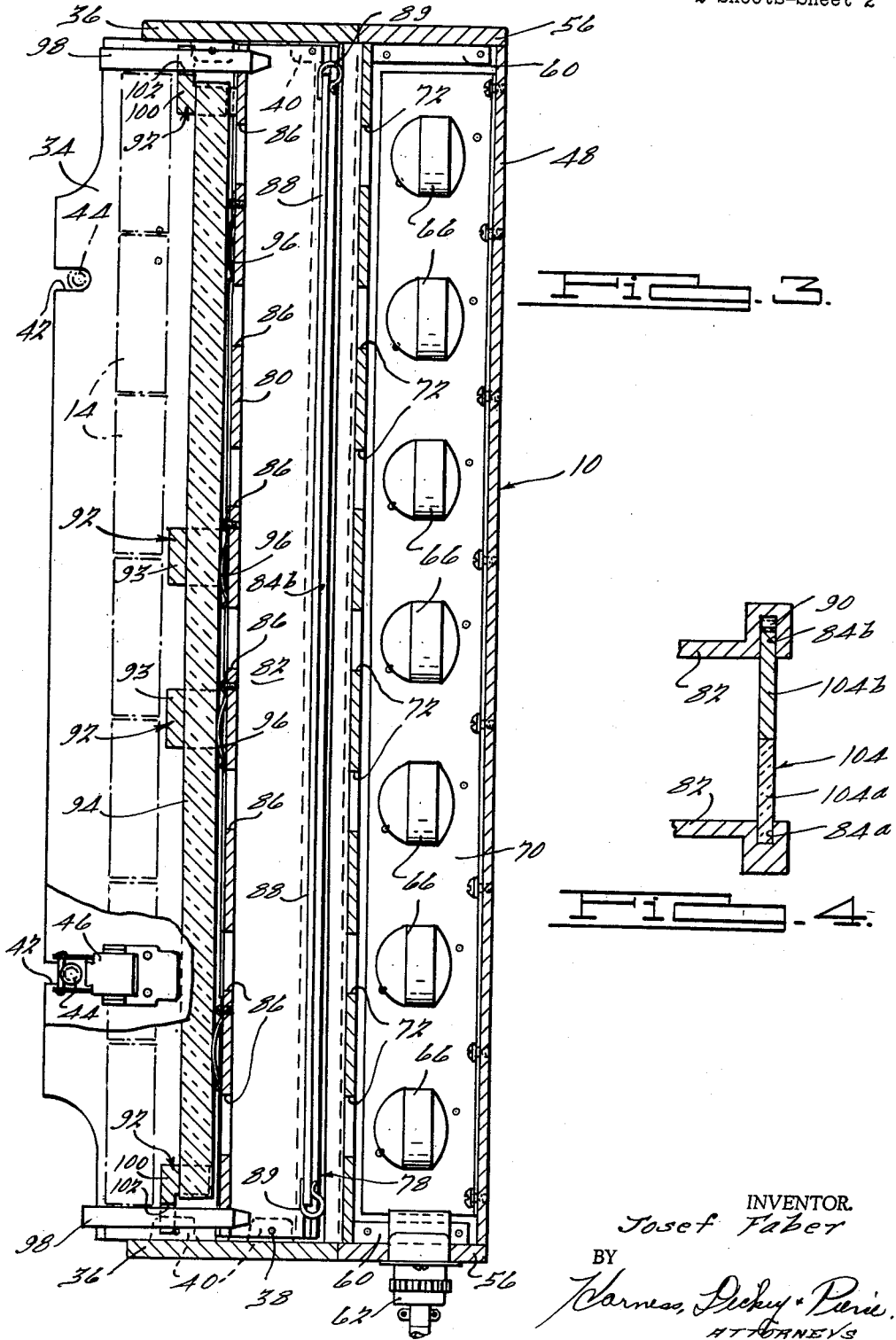

3,128,626
ILLUMINATOR FOR LIQUID LEVEL GAUGE
Josef Faber, Lancaster, Ohio, assignor to Diamond Power Specialty Corporation, Lancaster, Ohio, a corporation of Ohio
Filed Dec. 11, 1961, Ser. No. 158,440
6 Claims. (Cl. 73—331)

The present invention broadly relates to liquid level gauges and more particularly to improvements in an illuminator for a bi-color indicating system employed in conjunction with liquid level gauges for use on high pressure steam boilers and the like.

The improved liquid level gauge illuminator comprising the present invention is predicated on the optical principles as disclosed in United States Patent No. 2,024,815, granted to Blackburn on December 17, 1935. The use of an illuminator of the type comprising the present invention overcomes the difficulties heretofore encountered in obtaining accurate and unambiguous readings of the liquid level in the gauge, particularly when the gauge is positioned at a substantial distance away from or above the boiler operator or water tender and further reduces the possibility of misinterpretation of the gauge indication even when viewed at relatively close distances.

The illuminator device comprising the present invention is particularly applicable for use in conjunction with so-called multiple port liquid level gauges of the type shown and described in U.S. Patent No. 2,949,031, granted to Bruni et al. on August 16, 1960. Gauges of this type employ a plurality of discrete relatively small ports in lieu of one single large viewing aperture to overcome the design difficulties introduced by the high pressures and temperatures to which the liquid level gauges are exposed. By virtue of the multiple port construction, the cumbersome, massive and expensive construction of liquid level gauges heretofore known is avoided and suitable cross bracing can be employed to form a compact, lightweight housing having the requisite strength. At the same time, the viewing glass in each of the ports is subjected to greatly reduced strains thereby substantially reducing the frequency of breakage and providing for improved durability and serviceability of the gauge. The multiple viewing ports of liquid level gauges of this type can be arranged either rectilinearly and spaced from one another, or may be staggered in two or more rows to provide continuous observation of the liquid and vapor column.

Regardless of the specific type of liquid level gauge employed the use of an illuminator device of the type comprising the present invention employing an optical bi-color indicating system therein, provides substantially improved readability of the gauge. Conventionally, a red and green bi-color system is employed to visually indicate steam and water, respectively, in high pressure steam boilers.

In the bi-color multiple port gauge viewing system, a white light is filtered to provide two adjacent beams of colored light which are directed through each of the ports passing through a portion of the column of the fluid in the liquid level gauge. The disparate indices of refraction of steam and water, for example, cause one or the other of the two adjacent beams of light, depending on whether water or steam is present in that portion of the column, to be directed through an outer viewing port where it is visually observed while the other beam of light is laterally deflected against the side of the port and is dispersed so as not to be visible.

From the foregoing it will be apparent that appropriate optical relationships must be maintained between the filters, lenses, and port positions in order to obtain an accurate and unambiguous indication of the contents of the viewed portion of the gauge column. For example, misalignment of the color filter or the lens relative to each other and to the ports of the gauge may produce incorrect or at least ambiguous indications as to the true level of the liquid in the gauge because of reflections of the deflected or non-significant beam of light allowing it to be viewed by the operator or water tender in conjunction with the transmitted beam of light. A misaligned optical condition is further aggravated by the presence of condensate in the vapor portion of the column of the liquid level gauge which tends to modify, in localized areas, the refractive index of the vapor promoting further ambiguity of the indication of the gauge.

In illuminator devices of the types heretofore known the optical components thereof were separately mounted within the illuminator housing and individual adjusting means were provided for laterally positioning one or both of the optical components of the illuminator to assure accurate alignment. Jarring shocks to which the illuminator is inadvertently subjected during use as well as periodic disassembly and cleaning of the optical components have necessitated readjustment of the optical system to assure accurate alignment thereof. In many instances, such adjustments are made in the field by personnel unfamiliar with the optical relationships of the illuminator, resulting in aggravated misalignment conditions whereby inaccurate bi-color indications, and more frequently ambiguous indications, result detracting from the utility of the device.

It is accordingly, a primary object of the present invention to provide an improved illuminator device for liquid level gauges which incorporates therein a pre-aligned optical system which, on mounting on a multiple port type liquid level gauge, assures accurate and precise bi-color indications of the level of liquid in the gauge overcoming the problems commonly encountered in illuminator devices of the type heretofore known.

Another object of the present invention is to provide an improved illuminator device for liquid level gauges incorporating a removable slide assembly therein on which the color screen or filter and lens are mounted in pre-aligned positions preventing inadvertent maladjustment and misalignment of the optical components as well as facilitating maintenance, cleaning, and inspection thereof.

Still another object of the present invention is to provide an improved illuminator device which is removably mounted on a liquid level gauge and which illuminator device incorporates a slide assembly therein embodying the color screen and lens which coacts with index projections on the liquid level gauge assuring appropriate accurate alignment of the optical system with the multiple ports of the gauge.

A further object of the present invention is to provide an illuminator device incorporating a slide assembly therein which, on interchange of the illuminator from one side to the other side of the liquid level gauge, simply requires withdrawal and inversion of the color slide assembly instead of the time-consuming practice of disassembling the optical components of the illuminator as encountered in illuminator devices heretofore known whereby misalignment of the optical system can occur during reassembly, resulting in inaccurate or ambiguous liquid level indications.

A still further object of the present invention is to provide an improved illuminator device for liquid level gauges which is of simple and compact design, of durable and economical manufacture, which incorporates a pre-aligned bi-color optical system that maintains its accurate alignment in spite of jarring shocks during use and which system can be readily removed for cleaning and periodic inspection and simply reinstalled without readjustment assuring continued accurate liquid level indications, and which incorporates a higher intensity of illumination providing for increased readability thereof.

Other objects and advantages of the present invention will become apparent from the following detailed description taken in conjunction with the accompanying drawings, wherein:

FIGURE 1 is a side elevation view of an illuminator constructed in accordance with the preferred embodiments of the present invention, removably mounted on a multiple port liquid level gauge;

FIG. 2 is an enlarged transverse sectional view of the illuminator and gauge shown in FIGURE 1 and taken substantially along the line 2—2 thereof;

FIG. 3 is a longitudinal vertical sectional view of the illuminator shown in FIG. 2 and taken substantially along the line 3—3 thereof with the gauge shown fragmentarily in phantom for the purposes of clarity; and FIG. 4 is a fragmentary sectional view through the color screen and slide assembly illustrating an alternate construction of the filter for use in monochromatic industrial television remote viewing systems.

Referring now in detail to the drawings and as may be best seen in FIGURES 1–3, an illuminator generally indicated at 10 is adapted to be removably mounted on one side of a liquid level gauge 12 incorporating a plurality of viewing ports 14 thereon disposed in rectilinear longitudinally spaced relationship. The liquid level gauge 12 comprises a body 16 provided with a pair of pipes 18 terminating in flanges 20 connected to the upper and lower end portions thereof which are adapted to be connected to and communicate with a boiler or other liquid-vapor containing device of which the liquid level therein is to be observed. The pipes 18 are disposed in communication with a vertically extending columnar passage defined by a bore 22 extending longitudinally within the body 16.

The positions of the liquid and vapor within the bore 22 are observable through the plurality of ports 14, each of which comprises an outer coverplate 24 which is removably secured to the body 16 of the gauge such as by a plurality of screws. The coverplate 24 serves to removably clamp a circular gauge glass assembly 26 including suitable gasketing materials and mica shields in pressure-tight and sealing relationship within complementarily shaped bores in the body 16. A transverse passage 28 is provided in the body 16 which is positioned in communication with the bore 22 and the inner faces of the gauge glass assemblies 26 on each side of each port which in turn is viewable through a tapered circular passage 30 in each of the coverplates 24. The surface of the transverse passage 28 in the body of the gauge and the tapered circular passage 30 in each of the coverplates 24 are preferably provided with a plurality of serrations 32 which are operative to reflect and disperse the nonsignificant rays of light from the line of vision as will subsequently become more apparent. Reference is made to aforementioned United States Patent No. 2,949,031 for a more detailed description of a multiple port liquid level gauge of the general type to which the illuminator comprising the present invention is applicable.

The illuminator 10 comprises an elongated U-shaped housing 34 comprising a pair of side walls integrally connected along their rearward edges by a transverse back wall as may be best seen in FIG. 2. A coverplate 36 is removably secured to each end of the housing 34 such as by means of screws 38 having the shanks thereof extending through the side walls of the housing and disposed in threaded engagement with inwardly extending lugs 40 attached to the inner surface of the coverplate 36.

The forwardly directed edges of the side walls of the housing 34 are adapted to slidably overlie the side portions of the body 16 of the multiple port liquid level gauge 12. A pair of slots or grooves 42 are formed in the forward edge of each side wall of the housing and are adapted to slidably receive a pair of mounting pins 44 securely fastened to the body portion 16 of the gauge. The outer end portion of each of the mounting pins is provided with an annular groove extending therearound which is adapted to receive the engaging portion of a draw latch 46 mounted on the exterior surface of the side walls of the housing 34. A second pair of mounting pins 44a are incorporated on each side of the body 16 of the gauge adjacent to the pins 44 as shown in FIG. 2 for removably mounting the illuminator 10 on the opposite side of the gauge from that shown in the drawings.

An illuminating or lamp chamber is disposed at the rear of the housing 34 as defined by a U-shaped cover 48 hingedly mounted along one edge thereof by means of hinges 50 to one side wall of the housing 34. Swinging movement of the cover 48 relative to the housing 34 is restricted by a pair of draw latches 52 mounted along the other side of the cover 48 and having the engaging end portion thereof adapted to removably engage a hook-shaped bracket 54 secured to the housing. The end portions of the cover 48 are provided with removably mounted coverplates 56 which are removably secured thereto such as by means of screws 58 extending through the side walls of the cover 48 and disposed in threaded engagement with inwardly extending lugs 60 affixed to the inner surface of the coverplates 56. The bottom or lower coverplate 56 as viewed in FIGURES 1 and 3 is provided with an electrical receptacle for receiving an extension socket 62 for supplying electrical current to a plurality of lamp sockets 64 disposed in longitudinal spaced alignment in which prefocused type lamps 66 are disposed. The coverplates 56 may also be provided with suitable apertures 68 therein for ventilating the interior of the lamp chamber.

The lamp sockets 64 and prefocused lamps 66 are supported on an L-shaped bracket 70 as may be best seen in FIGS. 2 and 3 which extends substantially the entire length of the cover 48. The lamps 66 are disposed in appropriate longitudinally spaced relationship along the bracket 70 corresponding to and positioned in alignment with a plurality of light ports 72 extending through the rear wall of the housing 34 and which are disposed in substantially equal logitudinal increments corresponding to the longitudinal spacing of the ports 14 of the liquid level gauge 12. Approximate alignment between the light ports 72 and lamps 66 relative to the multiple ports 14 of the gauge is accomplished by the bearing coaction of the inner surfaces of the side walls of the housing 34 on the gauge body 16 and the coaction between the slots 42 and the mounting pins 44.

By virtue of the arrangement of the illuminating chamber shown, simple access can be obtained to the interior thereof by simply unlatching the draw latches 52 enabling the cover 48 to be pivoted about the hinges 50 enabling cleaning and replacement of the lamps 66 therein. In addition, each port of the multiple port liquid level gauge is provided with an individual lamp for illumination which incorporates a prefocused reflector plate providing thereby a substantially higher intensity of illumination and facilitating the readability of the color indication as viewed by the operator or water tender.

Each of the inner surfaces of the side walls of the housing 34 is provided with a pair of longitudinally extending spaced ribs 74 defining a pair of transversely aligned guide slots 76 in which the side edges of a slide assembly generally indicated at 78 are slidably and guidably disposed. The slide assembly 78 is of a general hat-shaped cross section comprising a transverse web 80 from which a pair of longitudinal flanges 82 extend rearwardly therefrom and are formed at the end portions thereof with a pair of transversely aligned grooves 84a, 84b. The dimensional relationships between the guide slots 76 and the side edges of the transverse web 80 are controlled so that longitudinal sliding movement of the slide assembly 78 relative to the housing 34 as well as relative transverse movement is provided to enable precise indexing and alignment of the optical components in a manner subsequently to be described. The central portion of the transverse web 80 is provided with a plurality of longitudinally spaced bores 86 therethrough which are positioned in spaced intervals corresponding to the spacing of the multiple ports 14 of the level gauge and the light ports 72 in the rear wall of the housing 34. The light ports 72 are preferably of a size slightly larger than the bores 86 to assure complete coverage of the area of the bore 86 in spite of slight misalignments therebetween. The bores 86 and light ports 72 cooperate to provide a beam of light comprising parallel rays and prevents transmission of miscellaneous non-oriented rays to the lens which could otherwise produce ambiguity in the level indication.

A filter or color screen 88 is disposed with the side edges thereof removably mounted in the grooves 84a, 84b of the flanges 82 and extends substantially the entire length of the slide assembly 78. The ends of the color screen 88 can be provided with suitable clips or bumpers 89 to protect against chipping or cracking of the end edges thereof. The color screen 88 comprises a pair of vertical halves indicated at 88a and 88b respectively, which transmit light of disparate colors such as, for example, red and green. The mating edges of the vertical halves 88a, 88b must be reasonably precisely positioned transversely of the assembly effecting an accurate demarcation between the two colors transmitted therethrough in order to give an accurate indication in accordance with the optical principles of the bi-color system subsequently to be described.

One edge of the color screen 88, as best seen in FIG. 2, is positioned in the groove 84a and is firmly seated thereagainst. The opposite longitudinal edge of the color screen 88 is restrained within the opposite groove 84b and is biased transversely toward the groove 84a by a longitudinally extending spring 90 or other resilient material assuring a firm seating relationship of the color screen in the groove 84a. The transverse width and the line of demarcation between the vertical halves 88a, 88b of the color screen 88 are dimensioned so that precise alignment of the color screen is present when the outer edge of the vertical half 88a is firmly seated in the groove 84a. While the color screen is shown in the drawings comprising a single sheet extending substantially the entire length of the slide assembly, it is also possible to employ a plurality of bi-colored strips which are held within the grooves 84a, 84b and positioned opposite to one or multiples of the light ports 72 and bores 86.

The forwardly directed surface of the transverse web 80 is provided with a series of longitudinally spaced brackets or lens holders 92 which are of a U-shaped configuration including an angularly extending bight portion 93 against which the forward face of a strip lens 94 is firmly seated and resiliently held in firm abutting contact by a series of leaf springs 96 as best seen in FIG. 3 assuring continued appropriate alignment thereof with respect to the color screen positioned therebehind.

It is the function of the strip lens 94 as will hereinafter be described in greater detail, to refract the bi-color light transmitted through the color screen 88 and focus the light transmitted therethrough into the ports 14 of the gauge so as to impinge on the liquid or vapor in the bore 22 and transverse passage 28. The strip lens 94 may comprise one integral lens as shown in FIG. 3 or a series of sections disposed in end-abutting relationship. The number of lens holders 92 employed will vary, depending on whether the strip lens is of a unitary or sectionalized construction. In either event, however, appropriate transverse alignment of the strip lens is maintained by the inner side edges of the lens holders 92. The lens holders 92 are removably mounted on the forward face of the transverse web 80 such as by screws 95 and are disposed between the bores 86 so as not to obstruct the passage of light directed therethrough.

By virtue of the optical construction of the illuminator as shown in the drawings, the light emitted from each lamp 66 is transmitted through the light port 72 and thence through the color screen 88 from which it passes through the bore 86 in the transverse web of the slide assembly and is refracted by the strip lens 94 and is directed into the circular passage 30 of a port 14 adjacent thereto and impinges on the vapor or steam contained within the bore 22 of the liquid level gauge 12. Depending on whether vapor or liquid such as steam or water, for example, is contained within the bore 22 and transverse passage 28 as determined by the level of water in the boiler, the bi-color light will be appropriately refracted whereby one beam will be transmitted through the gauge glass 26 and out through the circular passage 30 of the opposite port 14 where it is visible, whereas the other colored light will be deflected against the serrations 32 of the transverse passage 28 and circular passage 30 of the port adjacent thereto whereby it will be dispersed so as not to be visible to the boiler operator or water tender.

The degree of deflection or refraction of the bi-colored light impinging on the fluid in the bore 22 and transverse passage 28 of the level gauge is determined by the index of refraction of the particular fluid contained therein. Accordingly, the specific optical configuration of the strip lens 94 will vary in accordance with the specific fluid to be measured within the gauge.

In the case of water and steam, the optical arrangement is as shown in the illuminator and liquid level gauge shown in the drawings. The differences in the refractive index of steam as opposed to water effects a deflection of the bi-color light beam directed into the bore 22 so that conventionally when liquid is present therein the light transmitted to the viewer is green, whereas when steam is present in the bore of that port the light transmitted is red. In the case where the liquid level extends to a point part way between the upper and lower portion of the port, the light transmitted will be bi-color corresponding to green for the liquid portion and red for the steam portion thereabove.

In accordance with the specific optical arrangement shown in the drawings and particularly in FIG. 2 when the gauge is employed as a liquid level gauge for water and steam and wherein the vertical halves 88a, 88b are colored red and green, respectively, the bi-color light refracted by the strip lens 94 impinges on the fluid in the bore 22 of the gauge and is accordingly refracted in accordance with whether steam or water is present in that section of the bore adjacent to a port. For example, when steam is present in the bore 22 and in the transverse passage 28 extending between and disposed in light communication with the ports 14 on each side of the gauge, the red light is transmitted out through the circular passage 30 and is visible to the viewer whereas the green light is deflected against the side wall of the transverse passage 28 and the circular passage 30 and is not visible to the viewer. Conversely, when water is positioned in that portion of the bore 22 and transverse passage 28, the red light is deflected by the refracted index of the water and is directed against and reflected by the side walls of the transverse passage 28 and circular passage 30 so as not to be visible whereas the green light is refracted and transmitted out through the circular passage 30 so as to be visible to the viewer. In view of the fact that both red and green light impinges on the inner surfaces of the transverse passage 28 and the circular passages 30 in the coverplates 24, reflection of the non-significant light out through the circular passage is prevented by the incorporation of the serrations 32 on the inner surfaces which effect dispersion of the light so as to minimize transmission of the non-significant color beam avoiding a confusing or ambiguous indication.

It will be appreciated from the foregoing that appropriate alignment of the color screen 88, the strip lens 94 and the ports 14 of the liquid level gauge are essential in order to achieve an accurate color indication as to the level of liquid therein. By virtue of the pre-aligned condition of the strip lens and color screen on the slide assembly, accurate alignment between these two optical components is maintained. Precise transverse and longitudinal alignment between the lens and color screen of the slide assembly 78 and the bores 86 in the transverse web 80 thereof relative to the circular passages 30 of the ports is accomplished by an index pin 98 rigidly affixed to the lower and upper ends of the body 16 of the liquid level gauge and projecting therefrom in a manner as best shown in FIGS. 2 and 3 so as to coact with the end portions of the slide assembly 78 assuring precise transverse and vertical alignment thereof. As hereinbefore set forth, the small degree of relative movement between the slide assembly 78 and the housing 34 as provided by the clearance between the guide slots 76 and side edges of the transverse web 80 enables the slide assembly to shift relative to the housing as indexed by the index pins 98 providing precise alignment of the optical system. The index pins are securely fastened to the body 16 of the liquid level gauge by either a press fit or by threadably engaging the inner shank portions thereof in suitably threaded bores and are precisely positioned relative to the disposition of the multiple ports therebetween.

Each of the end portions of the slide assembly 78 are provided with a coacting flange 100 formed integrally with the terminal lens holders 92 and incorporating a semi-circular notch 102 along the edges thereof which are disposed so as to contact with the surface of the index pins 98. The projecting end portions of the index pins 98 are preferably provided with a suitable taper as shown in the drawings so as to facilitate mounting of the illuminator 10 on the gauge 12. The longitudinal camming action between the grooves 102 of the slide assembly and the tapered end portion of the index pins 98 serves to appropriately position the slide assembly relative to the port 14.

By virtue of the construction of the illuminator comprising the present invention, a high degree of versatility, flexibility, and serviceability is provided in addition to assuring continuous appropriate optical alignment of the optical system of the illuminator and the liquid level gauge. For example, if it is desired to reverse the position of the illuminator from one side to the other side of the gauge 12, it is only necessary to release the draw latches 46 enabling removal of the illuminator from the gauge. Since the optical configuration of the strip lens and color screen 88 is reversed, rather than disassembling the entire illuminator as heretofore was necessary, the upper coverplate 36 is removed and the slide assembly withdrawn and reinserted in inverted relationship and the coverplate replaced whereby the optical components on the slide assembly are correctly positioned for the reverse mounting of the illuminator. The illuminator can then be mounted on the gauge and the draw latches 46 engageably clamped over the mounting pins 44a on the opposite side of the gauge. If desired, the gauge body can be provided with index pins 98 projecting from each gauge face thereof enabling the illuminator to be readily interchanged from side to side. More conventionally, however, the index pins 98 can be removed from one side of the gauge and inserted in appropriately positioned bores on the opposite side of the gauge whenever such a reversal is desired.

The simplicity of construction and the removable feature of the slide assembly and pre-aligned optical components thereon enables simple cleaning of the entire system by merely removing the illuminator from the gauge, removing the upper coverplate 36 therefrom and withdrawing the assembly which can thereafter be cleaned to assure continuous brightness of illumination and clear color indication. After cleaning, the slide assembly can simply be reinserted within the housing 10 and the coverplate 36 refastened followed by remounting of the illuminator on the gauge whereby the coaction between the index pins 98 and the slide assembly assure appropriate optical alignment of the several components.

The description of the illuminator as hereinbefore set forth is directed to the form wherein visual observation of the colors in the ports is indicative of the level of liquid in the gauge. In the case of remote viewing by monochromatic industrial television apparatus, the bi-color filter or color screen 88 as shown in FIGS. 2 and 3 is removed and substituted by a light filter 104 as shown in FIG. 4 comprising a transparent or translucent vertical half 104a and an opaque half 104b. The light screen 104 is maintained in appropriate transverse alignment within the grooves 84a, 84b by the leaf spring 90 biasing the entire light filter in one direction and in firm seating relationship in the groove 84a. The line of demarcation between the transparent half 104a and opaque half 104b corresponds to the line of demarcation between the bi-color halves 88a, 88b of the color screen 88 as shown in FIG. 2. Accordingly, the light filter 104 is operative to effect a transmission of light or a complete blocking of light, depending on the refracting index of the fluid in the gauge adjacent to each viewing port. Conventionally, in boiler liquid water level gauges, employing remote television viewing, the liquid level of the gauge is indicated by the absence of light and the steam level in the gauge is indicated by the presence of light.

While it will be apparent that the embodiments of the invention herein disclosed are well calculated to fulfill the objects of the invention, it will be appreciated that the invention is susceptible to modification, variation and change without departing from the proper scope or fair means of the subjoined claims.

What is claimed is:

1. In a liquid level indicating system including a liquid level gauge of the type having at least one transparent gauge port for transmitting light through the gauge and a fluid contained in a columnar passage within the body of the gauge, the improvement comprising an illuminator adapted to be removably mounted on a gauge for directing a split beam of light into a gauge port thereof, said illuminator comprising an elongated housing formed with an open side adapted to be positioned adjacent to a gauge port, means for removably mounting said housing on a gauge, a rear wall of said housing disposed opposite to said open side formed with a light port therethrough adapted to be positioned in approximate axial alignment with a gauge port, illuminating means for directing a beam of light through said light port, a slide assembly removably mounted in said housing and extending longitudinally thereof, coacting means on said housing and said slide assembly for guidably and movably positioning said slide assembly in a plane transverse of said housing, a light filter comprising a pair of vertical halves mounted on said slide assembly in spaced relationship from said rear wall for splitting a beam of light directed therethrough into a pair of adjacent beams, a lens mounted on said slide assembly forwardly of said filter and in prealigned relationship therewith for refracting and focusing said pair of adjacent beams into a gauge port wherein one of said pair of adjacent beams is refracted so as to be visible to an observer in accordance with the refractive index of the fluid therein, and means on said slide assembly adapted to coact with index means on a gauge for precisely aligning the prealigned said filter and lens on said slide assembly relative to a gauge port.

2. In a liquid level indicating system including a liquid level gauge of the type having at least one transparent gauge port for transmitting light through the gauge and a fluid contained in a columnar passage within the body of the gauge, the improvement comprising an illuminator adapted to be removably mounted on a gauge for directing a split beam of light into a gauge port thereof, said illuminator comprising an elongated housing formed with an open side adapted to be positioned adjacent to a gauge port, means for removably mounting said housing on a gauge, a rear wall of said housing disposed opposite to said open side formed with a light port therethrough adapted to be positioned in approximate axial alignment with a gauge port, illuminating means for directing a beam of light through said light port, a slide assembly removably mounted in said housing and extending longitudinally thereof, said slide assembly comprising a transverse web having the side edges thereof guidably and movably positioned in guide means extending longitudinally along the inner surface of said housing, said web formed with a bore therethrough adapted to be disposed in approximate axial alignment with said light port, a light filter comprising a pair of vertical halves mounted on said slide assembly in spaced relation from said rear wall for splitting a beam of light directed therethrough into a pair of adjacent beams, a lens mounted on said transverse web forwardly of and overlying said bore therethrough and disposed in pre-aligned relationship with said filter for refracting and focusing said pair of adjacent beams into a gauge port wherein one of said pair of adjacent beams is refracted to be visible to an observer in accordance with the refractive index of the fluid therein, and engaging means on said slide assembly adapted to coact with index means on a gauge for precisely aligning the prealigned said lens and said filter on said slide assembly relative to a gauge port.

3. In a liquid level indicating system including a liquid level gauge of the type having at least one transparent gauge port for transmitting light through the gauge and a fluid contained in a columnar passage within the body of the gauge, the improvement comprising an illuminator adapted to be removably mounted on a gauge for directing a split beam of light into a gauge port thereof, said illuminator comprising an elongated housing formed with an open side adapted to be positioned adjacent to a gauge port, means for removably mounting said housing on a gauge, a rear wall of said housing disposed opposite to said open side formed with a light port therethrough adapted to be positioned in approximate axial alignment with a gauge port, illuminating means for directing a beam of light through said light port, a slide assembly removably mounted within said housing and extending longitudinally thereof, said slide assembly comprising a transverse web formed with a bore therethrough adapted to be positioned in approximate axial alignment with said light port, coacting means on said web and said housing for removably and guidably positioning said web in said housing, a pair of mounting flanges extending rearwardly of said web and formed at the projecting ends thereof with a pair of longitudinally extending opposing grooves, a light filter comprising a pair of vertical halves positioned so as to overlie said bore and disposed with the edges thereof in said grooves, resilient means for transversely urging said filter toward firm seating relationship in one of said grooves, a lens mounted on said web and positioned in pre-aligned relationship with said filter for refracting and focusing a pair of adjacent beams transmitted through said filter into a gauge port wherein one of said pair of adjacent beams is refracted so as to be visible to an observer in accordance with the refracted index of the fluid contained therein, and means on said slide assembly adapted to coact with index means on a gauge for precisely aligning the prealigned said filter and said lens on said slide assembly relative to a gauge port.

4. In a liquid level indicating system including a liquid level gauge of the type having at least one transparent gauge port for transmitting light through the gauge and a fluid contained in a columnar passage within the body of the gauge, the improvement comprising an illuminator adapted to be removably mounted on a gauge for directing a split beam of light into a gauge port thereof, said illuminator comprising an elongated housing formed with an open side adapted to be positioned adjacent to a gauge port, means for removably mounting said housing on a gauge, a rear wall of said housing disposed opposite to said open side formed with a light port therethrough adapted to be positioned in approximate axial alignment with a gauge port, an illumination chamber disposed rearwardly of said rear wall and including a lamp having a pre-focused reflector for directing a beam of light substantially axially through said light port, a slide assembly including a transverse web removably and guidably mounted in guide means within said housing and extending longitudinally thereof, said web formed with an aperture therethrough adapted to be disposed in approximate axial alignment with said light port, a light filter comprising a pair of vertical halves mounted on said slide assembly in spaced relation from said rear wall for splitting a beam of light directed therethrough into a pair of adjacent beams, a lens mounted on said web forwardly of and overlying said aperture and disposed in prealigned relationship with said filter for refracting and focusing said adjacent beams into a gauge port wherein one beam of said pair of adjacent beams is refracted to be visible to an observer in accordance with the refractive index of the fluid therein, and means on said slide assembly adapted to coact with index means on a gauge for precisely aligning said slide assembly relative to a gauge port.

5. In a liquid level indicating system including a liquid level gauge of a type having a plurality of transparent gauge ports for transmitting light through the gauge and a fluid contained in a columnar passage within the body of the gauge, the improvement comprising an illuminator adapted to be removably mounted on a gauge for directing a split beam of light into each of a plurality of gauge ports thereof, said illuminator comprising an elongated housing formed with an open side adapted to be positioned adjacent to a plurality of gauge ports, means for removably mouning said housing on a gauge, a rear wall of said housing disposed opposite to said open side formed with a plurality of light ports therethrough adapted to be positioned in approximate axial alignment with each of the plurality of gauge ports, an illumination chamber disposed rearwardly of said rear wall and defined by a cover removably mounted on said housing, a plurality of lamps having a prefocused reflector mounted within said cover and positioned to direct a beam of light substantially axially through each of said light ports, a slide assembly removably mounted within said housing and extending longitudinally thereof, said slide assembly comprising a transverse web formed with a plurality of bores therethrough adapted to be positioned in approximate axial alignment with each of said light ports, coacting means on said web and said housing for removably and guidably positioning said web in said housing, a pair of mounting flanges extending rearwardly of said web and formed at the projecting ends thereof with a pair of longitudinally extending opposing grooves, a light filter comprising a pair of vertical halves positioned so as to overlie said bores and disposed with the edges thereof in said grooves, resilient means for transversely urging said filter toward firm seating relationship in one of said grooves, a lens mounted on said web and positioned in pre-aligned relationship with said filter for refracting and focusing each of a pair of adjacent beams transmitted through said filter into a gauge port wherein one of said pair of adjacent beams is refracted so as to be visible to an observer in accordance with the refractive index of a fluid contained therein, and means on said slide assembly adapted to coact with index means on a gauge for precisely aligning the pre-aligned said filter and said lens on said slide assembly relative to a plurality of gauge ports.

6. In a liquid level indicating system, the combination comprising a liquid level gauge of the type having at least one transparent gauge port for transmitting light through said gauge and a fluid contained in a columnar passage within the body of said gauge, an illuminator adapted to be removably mounted on said gauge for directing a split beam of light into said gauge port thereof, said illuminator comprising an elongated housing formed with an open side adapted to be positioned adjacent to said gauge port, co-acting means on said gauge and said housing for removably mounting said housing on said gauge, a rear wall of said housing disposed opposite to said open side formed with a light port therethrough adapted to be positioned in approximate axial alignment with said gauge port, illuminating means for directing a beam of light through said light port, a slide assembly removably mounted within said housing and extending longitudinally thereof, said slide assembly comprising a transverse web formed with a bore therethrough adapted to be positioned in approximate axial alignment with said light port, coacting means on said web and said housing for removably and guidably positioning said web in said housing, a pair of mounting flanges extending rearwardly of said web and formed at the projecting ends thereof with a pair of longitudinally extending opposing grooves, a light filter comprising a pair of vertical halves positioned so as to overlie said bore and disposed with the side edges thereof in said grooves, resilient means for transversely urging said filter into firm seating relationship in one of said grooves, a lens mounted on said web and positioned in pre-aligned relationship with said filter for refracting and focusing a pair of adjacent beams transmitted through said filter into said gauge port wherein one of said pair of adjacent beams is refracted so as to be visible to an observer in accordance with the refractive index of the fluid contained therein, a pair of index pins affixed to and projecting from said gauge and disposed in predetermined relationship with respect to said gauge port, and means on said slide assembly adapted to coact with said index pins on said gauge for precisely aligning the pre-aligned said filter and said lens on said slide assembly relative to said gauge port.

References Cited in the file of this patent
UNITED STATES PATENTS
2,949,031   Bruni et al. _____ Aug. 16, 1960

UNITED STATES PATENT OFFICE
CERTIFICATE OF CORRECTION

Patent No. 3,128,626              April 14, 1964

Josef Faber

It is hereby certified that error appears in the above numbered patent requiring correction and that the said Letters Patent should read as corrected below.

In the grant (only), line 1, for "Joseph Faber" read -- Josef Faber --; column 1, line 43, for "gauge," read -- gauge. --; column 4, line 44, for "logitudinal" read -- longitudinal --; column 10, line 43, for "mouning" read -- mounting --.

Signed and sealed this 6th day of October 1964.

(SEAL)
Attest:

ERNEST W. SWIDER
Attesting Officer

EDWARD J. BRENNER
Commissioner of Patents